Figure 1:
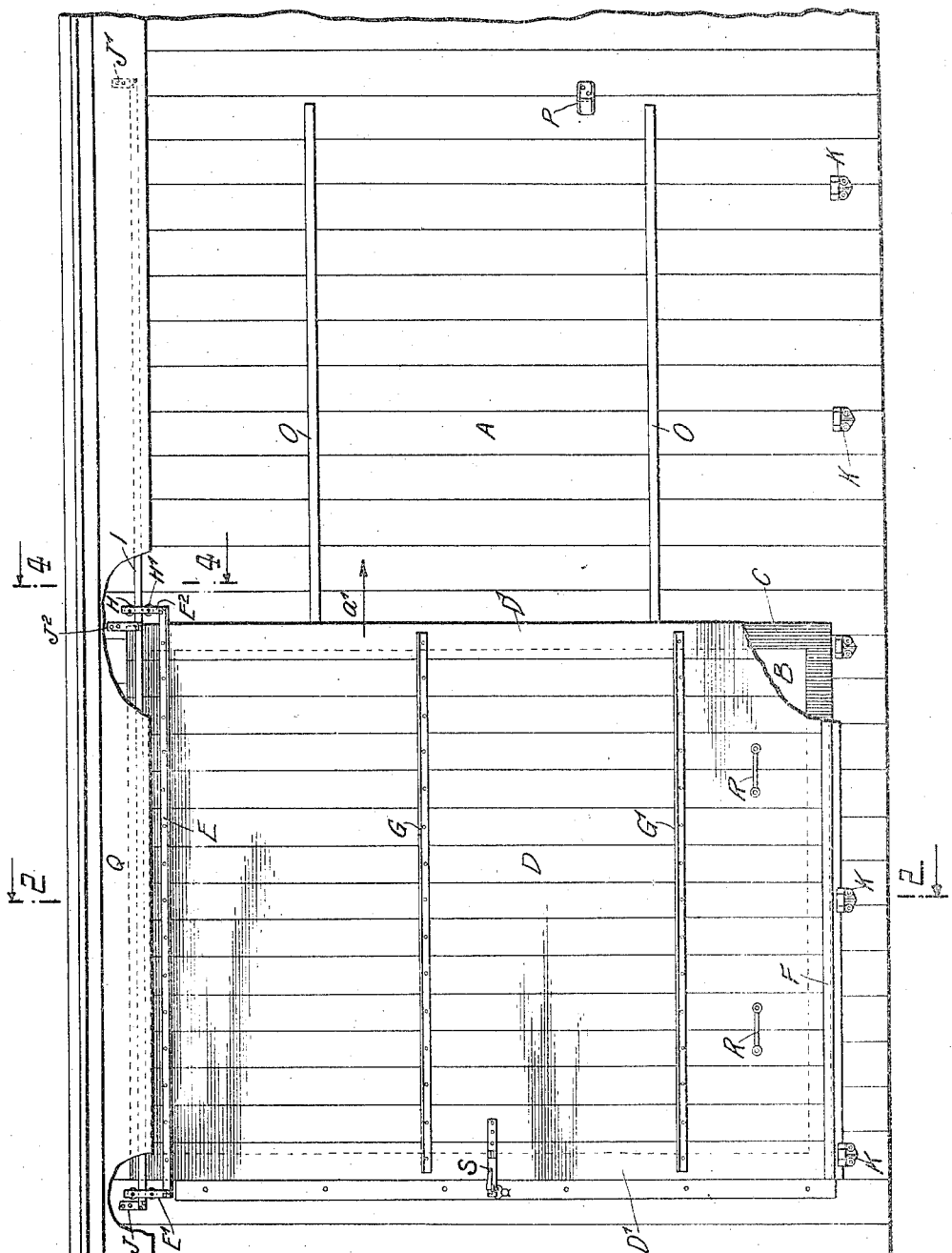

G. W. CLEMMONS.
BOX CAR DOOR.
APPLICATION FILED OCT. 14, 1914.
1,177,018.
Patented Mar. 28, 1916.
2 SHEETS—SHEET 2.
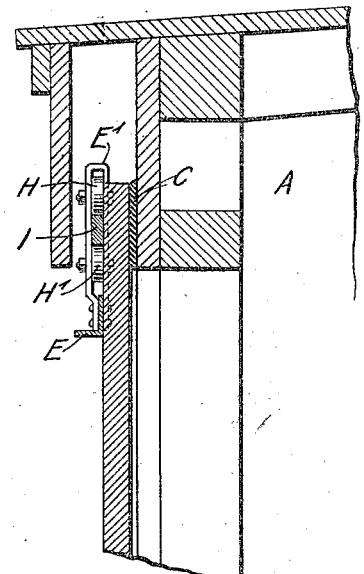
Fig. 2.
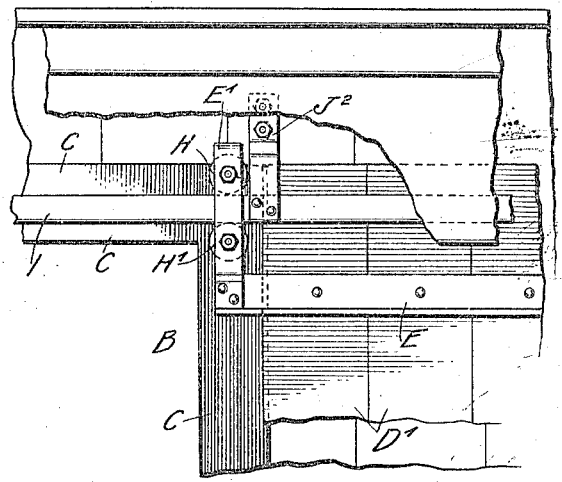
Fig. 3.
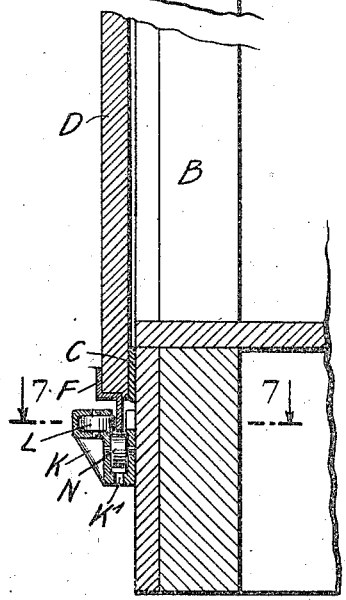
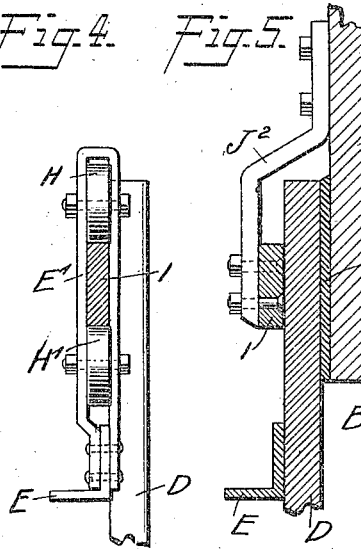
Fig. 4. Fig. 5.
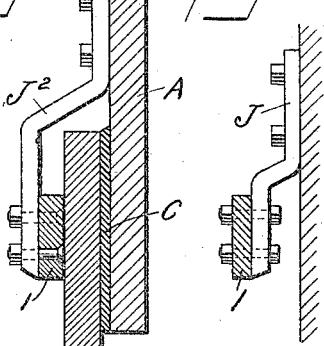
Fig. 6.
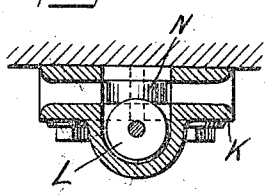
Fig. 7.
WITNESSES
INVENTOR
George W. Clemmons
BY
ATTORNEYS

UNITED STATES PATENT OFFICE.

GEORGE WASHINGTON CLEMMONS, OF HOBOKEN, NEW JERSEY, ASSIGNOR OF ONE-HALF TO EDGAR HENNIGAR, OF JERSEY CITY, NEW JERSEY.

BOX-CAR DOOR.

1,177,018.

Specification of Letters Patent. Patented Mar. 28, 1916.

Application filed October 14, 1914. Serial No. 866,625.

*To all whom it may concern:*

Be it known that I, GEORGE W. CLEMMONS, a citizen of the United States, and a resident of Hoboken, in the county of Hudson and State of New Jersey, have invented a new and Improved Box-Car Door, of which the following is a full, clear, and exact description.

The object of the invention is to provide a new and improved box car door arranged to be practically non-detachable and except under most extraordinary circumstances can not be lost, and which reduces to a minimum the possibility of the door becoming jammed due to shifting of the freight or other common obstructions, the door when in closed position having ample cover lap all around the door opening to provide weather-tight conditions, the door when in open position extending beyond the door post, thus preventing the edge of the door from being splintered or injured when loading heavy freight into the car, and the door being perfectly smooth at the inner face, thus insuring easy sliding of the door in case of freight obstructions.

A practical embodiment of the invention is represented in the accompanying drawings forming a part of this specification, in which similar characters of reference indicate corresponding parts in all the views.

Figure 1 is a side elevation of a box car door as applied, parts being broken out; Fig. 2 is an enlarged cross section of the same on the line 2—2 of Fig. 1; Fig. 3 is an enlarged side elevation of a portion of the box car door, as applied, and showing the door in open position, parts being broken out; Fig. 4 is an enlarged cross section of the box car door on the line 4—4 of Fig. 1; Fig. 5 is a cross section of the door in closed position, the overhead track and the intermediate bracket for supporting the track; Fig. 6 is a cross section of the track and one of the end brackets for supporting the track; and Fig. 7 is an enlarged sectional plan view of one of the brackets attached to the car below the door, the section being on the line 7—7 of Fig. 2.

The box car A is provided with a side door opening B surrounded by a facing C attached to the outer face of the corresponding side of the box car A and slightly raised from the said face. The box car door D when in closed position fits snugly onto the facing C to securely close the opening B and to provide a weather-tight structure, it being understood that the door projects beyond the sides, top and bottom of the opening B when the door is in closed position. The car door D is formed of a series of vertically disposed boards D′ arranged one alongside the other and secured to a number of bars E, F, G, G′, of which the bar E is the hanger bar and extends longitudinally on the outer faces of the boards D′ near the upper ends thereof, as plainly indicated in Fig. 1, the bar E being preferably in the form of an angle iron. The bar F is the bottom guide bar and extends longitudinally on the lower end of the door D and is approximately Z-shape in cross section with the lower member projecting downward from the bottom of the door D and offset inwardly from the face of the door, as plainly indicated in Fig. 2. The bars G, G′ are of angle iron and extend longitudinally intermediate the bars E and F, and the several boards D′ are fastened by bolts, screws, nails or other fastening devices to the said bars E, F, G, G′. By the construction described a very strong and durable door is provided and which has an entirely smooth inner face so as to snugly fit onto the facing C when the door is in closed position.

The ends of the hanger bar E project yond the ends of the door D and to the sai projecting ends are fastened upwardly extending hangers E′, E², each preferably in the form of a loop, as plainly indicated in Figs. 2 and 4. In each hanger E′, E² are journaled vertically disposed rollers H and H′, spaced apart within the loop to accommodate a track I extending through the loop, and on the upper edge of which rest the upper rollers H to normally support the door D on the side of the box car A. The track I is in the form of a rectangular bar extending lengthwise of the car and overlying the outer face of the door D near the upper end thereof so as to hold the door against the facing C with a view to provide a weather-tight joint between the door and the facing. The ends of the track I are attached at their inner faces to upwardly extending brackets J, J′ secured to the face of the box car A, and the middle portion of the track I has its outer face attached to an upwardly extending bracket J² secured to the face of the box car A. It is understood that the bracket J² is attached to the outer face of the track I to leave the inner face of the track unobstructed thus allowing the track I to closely overlie the outer face of the door whether the latter is moved into open or closed position. It will also be noticed that by fastening the track with its inner face onto the brackets J, J' and with its outer face onto the bracket J² the track is not liable to be bent or warped.

By reference to Fig. 1, it will be noticed that the hangers E', E² are close to the right-hand side of the brackets J, J² at the time the door D is in closed position so that the door can be readily moved to the right in the direction of the arrow a' with the rollers H traveling on top of the track I until the door is in completely open position, at which time the hanger E' abuts against the bracket J² while the hanger E² with its rollers H, H' is adjacent to the bracket J'. It will be noticed that the track I not only forms a means for the roller H to travel on to support the car door D and to allow convenient sliding of the same into open or closed position, but at the same time the track I overlies the outer face of the door D so as to hold the inner smooth face thereof against the facing C at the sides, top and bottom. The lower roller H' in each hanger E' and E² is adapted to abut against the under side of the track I in case an attempt is made to lift the door D so that the door cannot be disengaged or unhooked from the track I.

A series of brackets or bearings K are attached to the outer face of the box car A below the door D, the brackets being spaced apart suitable distances, and in each bracket is journaled a horizontally disposed roller L and a vertically disposed roller N. The horizontally disposed roller L is adapted to be engaged at its peripheral face by the outer face of the depending member of the bottom guide bar F while the lower edge of the said depending member is normally a short distance above the top of the peripheral face of the roller N, but in case the door D should sag then the said lower edge of the depending member F is adapted to travel on the roller N so as to insure an easy sliding of the door into open and closed position. As shown in Fig. 1, three such brackets are provided below the door opening, and two more brackets are on the face of the side of the box car A to the right of the door D so as to accommodate the door when the latter is in an open position. Each of the brackets K is preferably provided at the bottom with a drain opening K' to allow rain water or the like to drain out of the bracket. It will be noticed that by the arrangement described the door D cannot be pried open at the lower end as the bottom member of the bar F abuts against the roller L, which latter also serves to aid in holding the inner face of the door D firmly against the facing C when the door is in closed position to render the door weatherproof. By disposing the brackets K in the manner described, at least, two of the brackets are engaging the lower end of the door when the latter is moved into an open or closed position, thus preventing the door from being pried outwardly by unauthorized persons.

Bearing bars O are attached to the face of the side of the car at the right-hand side of the door opening B and its facing C, and the outer faces of these bars O are approximately flush with the facing C to prevent the inner smooth face of the door D from rubbing against the face of the side of the box car A when the door is moved into open or closed position. A stop P is also attached to the side of the box car A for the right-hand side of the door D to abut against when moved into an open position. It is understood that this stop P prevents the hanger E' from striking too hard against the bracket J² at the time the door is opened as previously explained.

The overhead suspension of the door D shown and described is preferably protected by a ledge Q depending from the projecting side of the roof of the car A. The door D is provided with the usual handles R for conveniently sliding the door into open or closed position, and the door is also provided with a suitable locking device S for locking the door when in closed position.

From the foregoing it will be seen that by the arrangement described the door is practically non-detachable, and is not liable to become jammed in case the freight on the inside of the car abuts against the inner face of the door. By providing the overhead hanger and the bottom guide, as shown and described, the door can be readily opened even if the freight should bear against the inner face of the door without unduly straining the door. It will also be noticed that when the door is in closed position a weather-tight joint is provided, and when the door is opened, its left-hand side is beyond the right-hand door post thus preventing the said left-hand side of the door from being splintered or injured when loading heavy freight into the car or removing it therefrom.

Having thus described my invention, I claim as new and desire to secure by Letters Patent:

1. In a box car having a side door opening provided with a frame surrounding the same, and slightly raised from the outer face of the side of the car, a sliding door smooth at the inner face and adapted to be moved into closed or open position relative to the said door opening, the door when in closed position fitting closely onto the frame surrounding the door opening, bearing bars attached to the face of the side of the car at one side of the door opening and its surrounding frame, the outer faces of said bars being approximately flush with the face of the frame surrounding the door opening to prevent the inner smooth face of the door from rubbing against the side of the car when the door is moved into open or closed position, an overhead track, and means carried by the door and mounted to travel on the said track, the said track overlying the outer face of the door at the upper end thereof, and bearing against the same to hold the inner smooth face of the door against the said frame surrounding the door opening when the door is in closed position and against the said bearing bars when the door is moved to open position.

2. In a box car having a side door opening provided with a frame surrounding the same and projecting slightly from the outer face of the side of the car, bearing bars attached to the side of the car at one side of the door opening and its frame, the bars being flush with the face of the frame, a door adapted to close the said door opening and adapted to be moved along the said bearing bars to clear the said opening, the door when in closed position extending beyond the bottom, top and sides of the opening and fitting closely onto the said frame, an overhead track attached to the car and overlying the outer face of the door at the upper end thereof, the said track bearing against the door when the latter is in open or closed position, and means carried by the door and mounted to travel on the said track.

In testimony whereof I have signed my name to this specification in the presence of two subscribing witnesses.

GEORGE WASHINGTON CLEMMONS.

Witnesses:
SAMUEL ENGLER,
ANNA DARRESS.